US010909115B2

(12) United States Patent
Zong et al.

(10) Patent No.: US 10,909,115 B2
(45) Date of Patent: Feb. 2, 2021

(54) SYSTEM EVENT SEARCH BASED ON HETEROGENEOUS LOGS

(71) Applicant: NEC Laboratories America, Inc., Princeton, NJ (US)

(72) Inventors: Bo Zong, West Windsor, NJ (US); Jianwu Xu, Titusville, NJ (US); Haifeng Chen, West Windsor, NJ (US)

(73) Assignee: NEC CORPORATION ( * ) Notice: Subject to any disclaimer, the term of this patent is extended or adjusted under 35 U.S.C. 154(b) by 136 days.

(21) Appl. No.: 16/203,008

(22) Filed: Nov. 28, 2018

(65) Prior Publication Data
US 2019/0171622 A1 Jun. 6, 2019

Related U.S. Application Data

(60) Provisional application No. 62/594,243, filed on Dec. 4, 2017, provisional application No. 62/608,631, filed on Dec. 21, 2017.

(51) Int. Cl.
G06F 7/00 (2006.01)
G06F 16/2453 (2019.01)
G06F 16/2458 (2019.01)
G06F 16/2455 (2019.01)
G06F 16/9038 (2019.01)
G06F 16/17 (2019.01)
G06F 16/14 (2019.01)
(Continued)

(52) U.S. Cl.
CPC ........ G06F 16/24542 (2019.01); G06F 11/08 (2013.01); G06F 16/152 (2019.01); G06F 16/1734 (2019.01); G06F 16/2455 (2019.01); G06F 16/2465 (2019.01); G06F 16/9038 (2019.01); G06K 9/6227 (2013.01); G06F 2216/03 (2013.01)

(58) Field of Classification Search
CPC ............. G06F 16/9038; G06F 16/1734; G06F 16/2455; G06F 16/24542; G06F 16/2465
USPC .................................. 707/736, 737, 999.006
See application file for complete search history.

(56) References Cited

U.S. PATENT DOCUMENTS 9,542,255 B2   1/2017 Fu et al.
9,654,510 B1   5/2017 Pillai et al.
(Continued)

OTHER PUBLICATIONS

Zong, Bo, et al. "Towards scalable critical alert mining," Proceedings of the 20th ACM SIGKDD international conference on Knowledge discovery and data mining, ACM, Aug. 2014, 10 pages.
(Continued)

Primary Examiner — Md I Uddin
(74) Attorney, Agent, or Firm — Joseph Kolodka

(57) ABSTRACT

Systems and methods for system event searching based on heterogeneous logs are provided. A system can include a processor device operatively coupled to a memory device wherein the processor device is configured to mine a variety of log patterns from various of heterogeneous logs to obtain known-event log patterns and unknown-event log patterns, as well as to build a weighted vector representation of the log patterns. The processor device is also configured to evaluate a similarity between the vector representation of the unknown-event and known-event log patterns, identify a known event that is most similar to an unknown event to troubleshoot system faults based on past actions for similar events to improve an operation of a computer system.

20 Claims, 12 Drawing Sheets

(51) Int. Cl.
*G06F 11/08* (2006.01)
*G06K 9/62* (2006.01)

(56) References Cited

U.S. PATENT DOCUMENTS

2016/0086097 A1* 3/2016 Zhang .................. G06N 20/00
706/12
2017/0139806 A1 5/2017 Xu et al.

OTHER PUBLICATIONS

Brants, Thorsen, et al. "A system for new event detection," Proceedings of the 26th annual international ACM SIGIR conference on Research and development in informaion retrieval, ACM, Jul. 2003, 8 pages.
Ramos, Juan, "Using TF-IDF to determine word relevance in document queries," Proceedings of the first instructional conference on machine learning, Dec. 2003, 4 pages, vol. 242.
Ning, Xia, et al. "HLAer: a System for Heterogeneous Log Analysis," SDM Workshop on Heterogeneous Learning, 2014, pp. 1-22.

* cited by examiner

SYSTEM EVENT SEARCH BASED ON HETEROGENEOUS LOGS

RELATED APPLICATION INFORMATION

This application claims priority to U.S. Provisional Patent Application No. 62/594,243, filed on Dec. 4, 2017 and U.S. Provisional Patent Application No. 62/608,631, filed on Dec. 21, 2017, both incorporated herein by reference herein their entirety. Moreover, this application is related to commonly assigned U.S. patent application Ser. No. 16/207,644, filed on Dec. 3, 2018.

BACKGROUND

Technical Field

The present invention relates to systems and methods for event searching and more particularly for searching system events based on heterogeneous logs.

Description of the Related Art

Logs are useful sources of information that can describe system events, such as system faults, failures, crashes, recoveries, infiltrations, and so on. When a system event occurs, a set of logs can be generated to indicate what happens before, during, and/or after the event.

However, conventional methods of system maintenance and troubleshooting require system administrators to investigate related logs and to figure out solutions to the events that damage the underlying system. These investigation tasks can be tedious and time-consuming for system for system administrators as they manually and repeatedly sift through the logs even if similar system events have occurred before.

SUMMARY

According to one embodiment of the present invention, a system is provided for searching system events based on heterogeneous logs, the system including a processor device operatively coupled to a memory device wherein the processor device is configured to mine a plurality of log patterns from a first plurality of heterogeneous logs and a second plurality of heterogeneous logs to obtain a set of known-event log patterns for each known event and a set of unknown-event log patterns for each unknown event, as well as to build a weighted vector representation of each set of known-event log patterns and of each set of unknown-event log patterns. The processor device is further configured to evaluate a similarity of the vector representation of each set of unknown-event log patterns to the vector representation of each set of known-event log patterns, identify a known event that is most similar to an unknown event based on the evaluated similarity to troubleshoot system faults based on past actions for similar events to improve an operation of a computer system.

According to another embodiment of the present invention, a computer program product for searching system events based on heterogeneous logs is provided. The computer program product includes a non-transitory computer readable storage medium having program instructions which when executed by a computing device cause the computing device to perform a method for system event searching based on heterogeneous logs. The method includes mining, by the processor device based on instructions stored on a storage device coupled to the processor device, a plurality of log patterns from a first plurality of heterogeneous logs and a second plurality of heterogeneous logs to obtain a set of known-event log patterns for each known event and a set of unknown-event log patterns for each unknown event. The method also includes building, by the processor device, a weighted vector representation of each set of known-event log patterns and of each set of unknown-event log patterns, as well as evaluating, by the processor device, a similarity of the vector representation of each set of unknown-event log patterns to the vector representation of each set of known-event log patterns. The method further includes identifying, by the processor device, a known event that is most similar to an unknown event based on the evaluated similarity to troubleshoot system faults based on past actions for similar events to improve an operation of a computer system.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the embodiments of present invention, systems and methods are provided for searching system events based on heterogeneous logs. The various embodiments described herein provide an efficient way for users or administrators of a system to search for and find known system events similar to unknown system events to facilitate tasks including, but not limited to, fault diagnosis, fault prevention, and troubleshooting.

Figure 1:
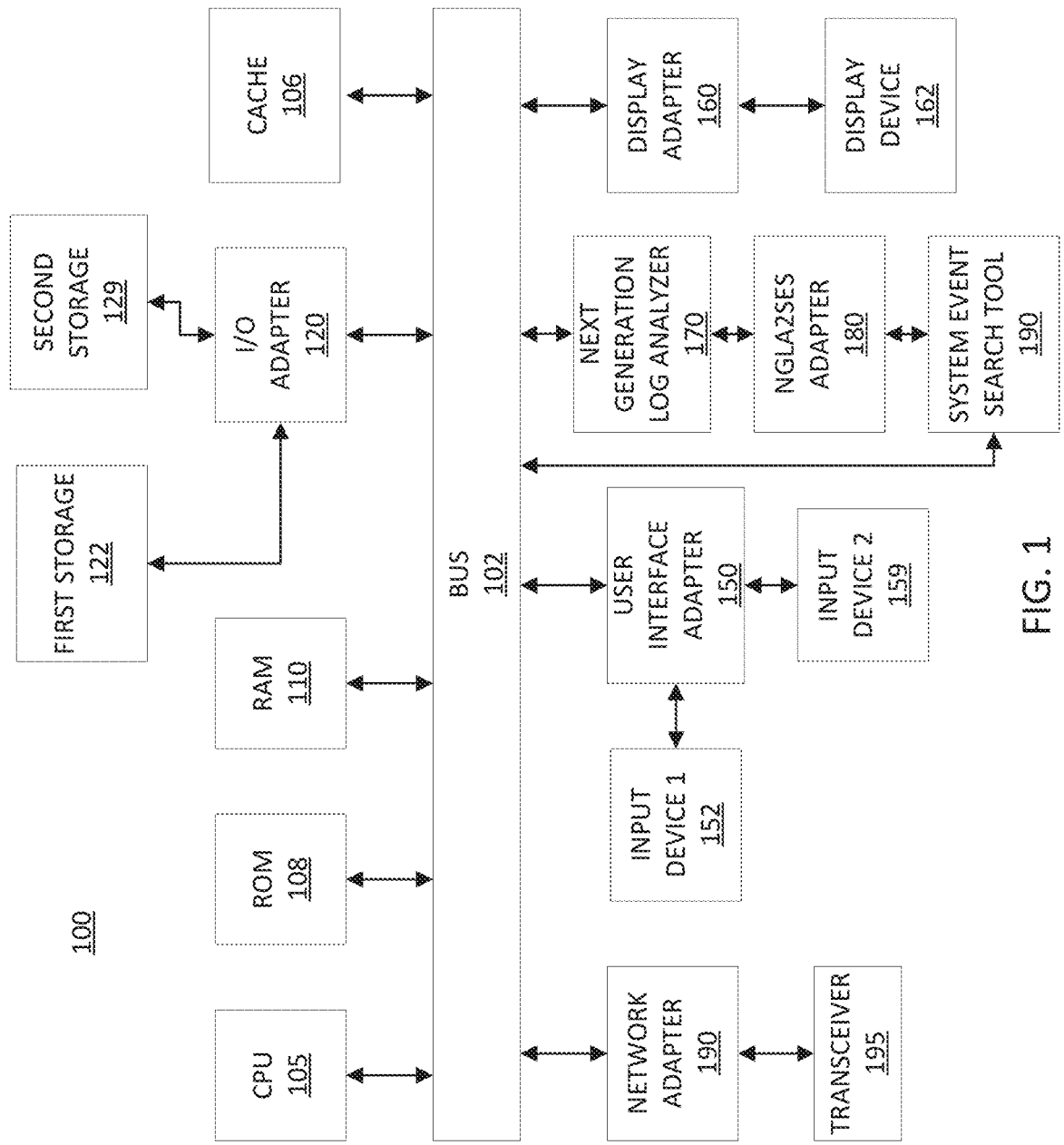
FIG. 1 is a schematic and block diagram illustrating a high-level system for searching system events based on heterogeneous logs in accordance with an embodiment of the present invention.

Referring now to FIG. 1, an exemplary computer system (e.g., a server or a network device) for searching system events based on heterogeneous logs 100 is shown in accordance with an embodiment of the present invention. The computer system 100 includes at least one processing device (CPU) 105 operatively coupled to other components via a system bus 102. A cache 106, a Read Only Memory (ROM) 108, a Random-Access Memory (RAM) 110, an input/output (I/O) adapter 120, a network adapter 190, a user interface adapter 150, a Next Generation Log (NGL) Analyzer 170 and a display adapter 160, can be operatively coupled to the system bus 102.

A first storage device 122 and a second storage device 129 can be operatively coupled to system bus 102 by the I/O adapter 120. The storage devices 122 and 129 can be any of a disk storage device (e.g., a magnetic or optical disk storage device), a solid state magnetic device, and so forth. The storage devices 122 and 129 can be the same type of storage device or different types of storage devices. Either or both of the storage devices 122 and 129 can be configured to operate as a data store or database to store various logs of system events (e.g., heterogeneous logs). The NGL Analyzer 170 can include software and/or hardware and can be configured to mine or extract log patterns from sets of heterogeneous logs.

A transceiver 195 can be operatively coupled to system bus 102 by network adapter 190. A display device 162 is operatively coupled to system bus 102 by display adapter 660. A System Event Search (SES) tool 190 can be operatively coupled to system bus 102 directly or indirectly, for example via Next-Generation-Analytics-to-System-Event-Search (NGLA2SES) adapter 180 and NGL Analyzer 170. The system event search tool can be configured to receive event log patterns translated by the NGLA2SES adapter 180 from output log patterns mined by NGL Analyzer 170. The system event search tool can further be configured store representations of system events on a storage device such as storage devices 122 and 129. Display device 162 (e.g., a screen or monitor) can be configured to display troubleshooting options to a user/administrator of the system.

A first user input device 152 and a second user input device 159 can be operatively coupled to system bus 102 by user interface adapter 150. The user input devices 152 and 159 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 152 and 159 can be the same type of user input device or different types of user input devices. The user input devices 152 and 159 can be used to input and output information to and from system 100.

Other embodiments of the present invention can optionally include further processing units including a graphics processing unit ("GPU"), a mother board, or alternatively/additionally another storage medium, an operating system, one or more application software, as well as including one or more communication interfaces (e.g., RS232, Ethernet, Wifi, Bluetooth, USB). Useful examples of computing devices optionally included in or integrable with embodiments of the present invention include, but are not limited to, personal computers, smart phones, laptops, mobile computing devices, tablet PCs, and servers. In accordance with embodiments of the present invention, an event record log source can be a computer storage medium.

Of course, the computer system 100 can also include other elements (not shown), as readily contemplated by one of skill in the art, as well as omit certain elements. For example, various other input devices and/or output devices can be included in computer system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 100 are readily contemplated by one of ordinary skill in the art given the teachings of the present invention provided herein.

It should be understood that multiple computing devices can be operably linked to form a computer network in a manner as to distribute and share one or more resources, such as clustered computing devices and server banks/farms. In embodiments of the present invention each of the aforementioned elements (e.g., device, medium, source, or module) can be directly or indirectly communicably connected (e.g., via a wireless a wired electronic connection) to at least one other element of the system. As described in more detail below, some embodiments of the present invention can be wholly contained within a single computing device. Other embodiments however, can encompass a plurality of interconnected or networked devices and resources.

Figure 2:
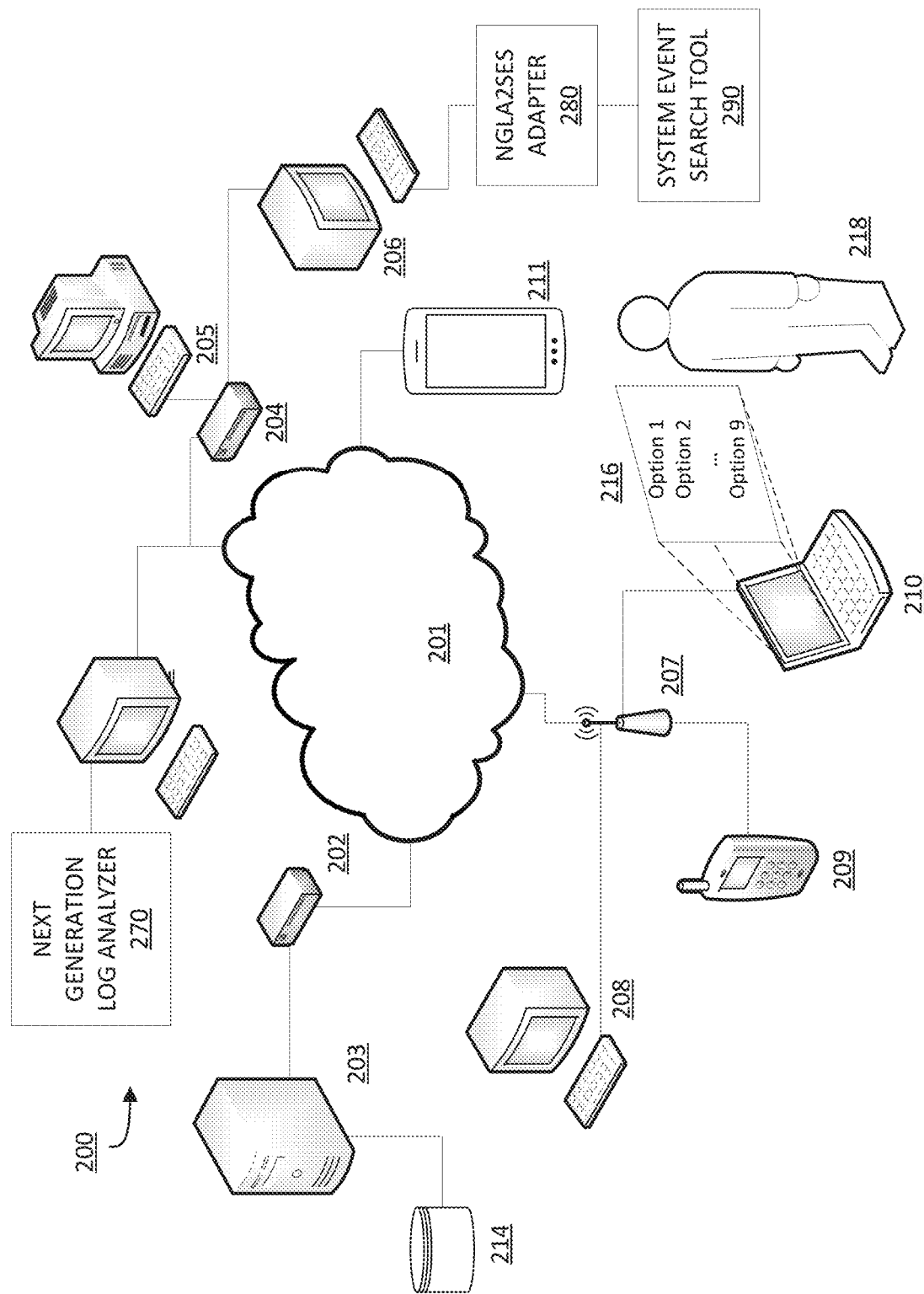
FIG. 2 is a block diagram illustrating a system for searching system events based on heterogeneous logs in accordance with an embodiment of the present invention.

Referring now to FIG. 2, a schematic overview of a system 200 for searching system events based on heterogeneous logs is illustratively depicted in accordance with an embodiment of the present invention. The system 200 can include one or more application servers 203 for electronically storing information used by the system. Applications in the server 203 can retrieve and manipulate information in storage devices and exchange information through a network 201 (e.g., a local area network (LAN), a Wide Area Network (WAN), one or more interconnected local area networks, one or more interconnected metropolitan area networks, the Internet, etc.) Applications in server 203 can also be used to manipulate information stored remotely and process and analyze data stored remotely across a network 201.

According to an exemplary embodiment, as shown in FIG. 2, exchange of information through network 201 or another network can occur through one or more high speed connections. In some cases, high speed connections can be over-the-air, passed through networked systems, directly connected to one or more networks 201, or directed through one or more routers 202. Router(s) 202 are optional and other embodiments in accordance with the present disclosure can employ no routers 202, one router 202, or a plurality of routers 202. One of ordinary skill in the art would appreciate that there are numerous ways server 203 can connect to network 201 for the exchange of information, and embodiments of the present disclosure are contemplated for use with any method for connecting to networks for the purpose of exchanging information. Further, while this application refers to high speed connections, embodiments of the present invention can be employed with connections of any speed.

In the various embodiments, components or modules of the system can connect to server 203 via network 201 or other network in numerous ways. For example, a component or module can connect to the system 200 through a computing device 212 directly connected to the network 201, through a computing device 205, 206 connected to the network 201 through a routing device 204, through a computing device 208, 209, 210 connected to a wireless access point 207, through a computing device 211 via a wireless connection (e.g., CDMA, GMS, 3G, 4G) to the network 201, etc. One of ordinary skill in the art will appreciate that there are numerous ways that a component or module can connect to server 203 via network 201 or other network, and embodiments of the present disclosure are contemplated for use with any method for connecting to server 203 via network 201 or other network.

Furthermore, server 203 could be a personal computing device, such as a smartphone 211, acting as a host for other computing devices to connect to. In accordance with some embodiments of the present invention an event log source can be a networked device, including, but not limited to, server 203 or computing device 208, which includes a memory device.

For example, a server 203 can include a processor device coupled to a memory device configured to record and serve event logs. In some exemplary embodiments of the system 200, server 203 can include a data store/database 214 which can be configured to store system event logs. In other embodiments, computing device 212 can include a NGL Analyzer 270 configured to receive event logs from database 214 via server 203 through network 201 and to mine log patterns form the event logs. Computing device 206 can include an NGLA2SES adapter 280 and a System Event Search (SES) tool 290 configured compare and search vector representations of system events. The SES tool can also be configured to receive log patterns mined by the Next Generation Log Analyzer 270 via network 201 and NGLA2SES adapter 280. In some embodiments, the NGLA2SES adapter 280 can be configured to translate log pattern outputs from Next Generation Log Analyzer 270 into inputs suitable for SES. Computing device 210 can include a display device (e.g., a screen) that can be configured to display troubleshooting options 216 to a user/administrator 218 of the system 200 to identify system operation issues, expedite fault diagnosis and improve fault tracking, and provide system operation guidance. Alternatively, in other embodiments, such as the ones described in more detail below, the abovementioned elements can all be included together entirely within one of such exemplary computing devices. It should be understood by those skilled in the art that the aforementioned elements can be distributed in various combinations among the devices and components depicted in FIG. 2 and that all such combinations are contemplated hereby without departing from the scope of the disclosure of the present invention.

Figure 3A:
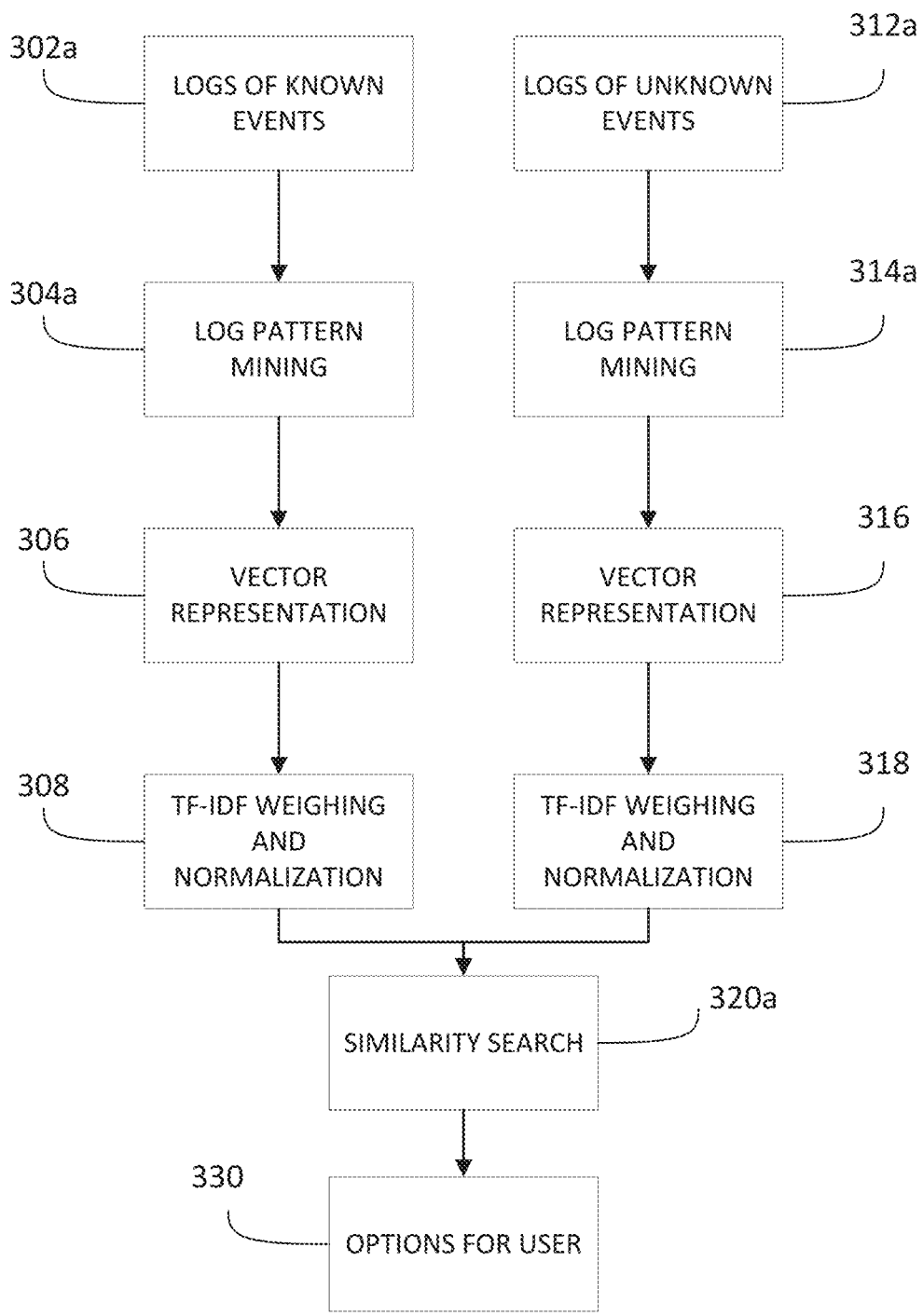
FIG. 3A is a block/flow diagram illustrating a system/method for searching system events based on heterogeneous logs accordance with an embodiment the present invention.

Referring now to FIG. 3A, a system/method for searching system events based on heterogeneous logs is illustratively depicted in accordance with an embodiment of the present invention. This embodiment employs a System Event Search (SES) tool to find known system events that are similar to unknown system events. In block 302a, multiple sets of logs can be obtained for known events where each set of logs represent detailed system-level information for a specific known event. In this embodiment, logs can be heterogeneous and can include both text-based logs and time-series-based logs. In block 304a log analytical techniques can be employed to discover a variety of log patterns. The variety of log patterns can include different categories of log patterns including, but not limited to, schema/template patterns, field patterns, sequential patterns, periodic patterns, and correlation patterns. In block 306, a uniform vector representation of system events is built wherein each vector can represent a system event. Each event's vector representation can include multiple dimensions where each dimension denotes a specific pattern discovered in block 304a. According to this embodiment, the value of the vector in each dimension can be the number of times the specific pattern (denoted by that dimension) occurs within the set of logs pertaining to the event represented by the vector. Once the vector dimensions are obtained, a term frequency-inverse document frequency (TF-IDF) algorithm can be employed in block 308 to weigh and normalize each dimension so that discriminative dimensions are weighed more heavily According to this embodiment, the above-described process can be repeated for unknown events. In block 312a, multiple sets of logs can be obtained for unknown events where each set of logs represent detailed system-level information for an unknown event. These logs can likewise be heterogeneous and can include both text-based logs and time-series-based logs. In block 314a log analytical techniques can be employed in a manner analogous to block 304a to discover a variety of log patterns for unknown events. This variety of log patterns can similarly include different categories of log patterns including, but not limited to, schema/template patterns, field patterns, sequential patterns, periodic patterns, and correlation patterns. It should be understood that the log patterns discovered for the unknown events can be the same as those discovered for the known events or different therefrom. In block 316, a uniform vector representation of system events is built wherein each vector can represent an unknown system event that is analogous to the representation built in block 306. Accordingly, each unknown event's vector representation can include multiple dimensions where each dimension denotes a specific pattern discovered in block 314a, and the value of the vector in each dimension can be the number of times the specific pattern (denoted by that dimension) occurs within the set of logs pertaining to the event represented by the vector. Once the vector dimensions are obtained for the vector representations of the unknown events, a term frequency-inverse document frequency (TF-IDF) algorithm can be employed in block 318 to weigh and normalize each dimension so that discriminative dimensions are weighed more heavily.

In accordance with an embodiment of the present invention, in block 320a, the similarity between known events and unknown events is evaluated by calculating a similarity between their respective vector representations (e.g., a cosine similarity). Thus, in accordance with this embodiment, the known event with the highest cosine similarity can be identified as the most similar known event for a given unknown event. In block 330a, a variety of options of steps or actions are presented that a user/administrator can take to troubleshoot the system or to expedite fault diagnosis and improve fault tracking.

Figure 3B:
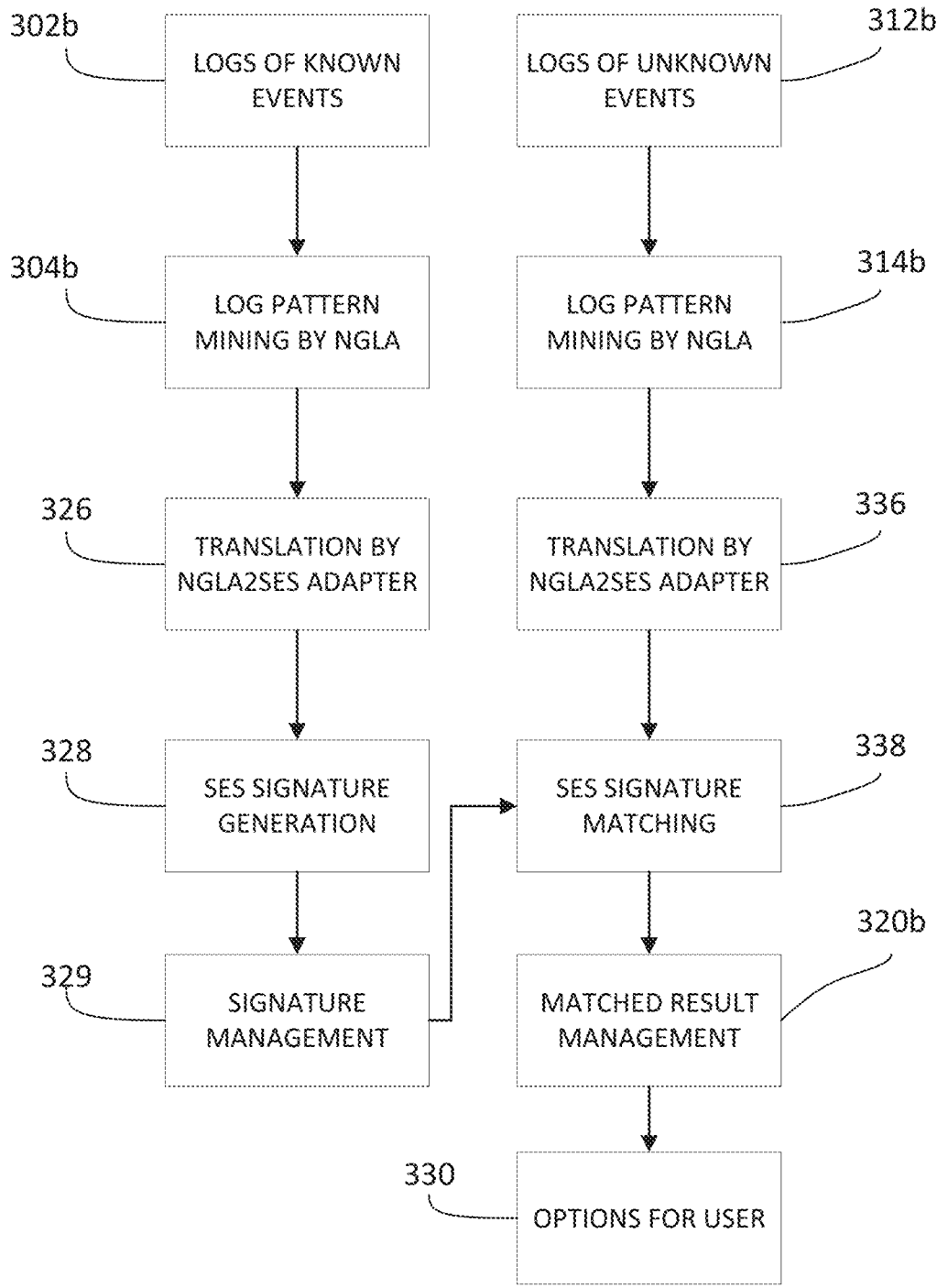
FIG. 3B is a block/flow diagram illustrating a system/method for searching system events based on heterogeneous logs in accordance with an embodiment the present invention.

Referring now to FIG. 3B, an alternative embodiment of system/method for searching system events based on heterogeneous logs is illustratively depicted. This embodiment employs a Next Generation Log Analytics (NGLA) system together with an SES to provide a user-friendly system/method.

In block 302b, multiple sets of logs can be obtained for known events where each set of logs represent detailed system-level information for a specific known event. In this embodiment, logs can be heterogeneous and can include both text-based logs and time-series-based logs. In block 304b a training request can be submitted by the user of the system, and the system can then call components of the NGLA system to mine and discover a variety of log patterns. The variety of log patterns can include different categories of log patterns including, but not limited to sequential patterns, periodic patterns, and correlation patterns. In block 326, an NGLA2SES adapter can translate the output log patterns from NGLA obtained in block 324 into an acceptable input for SES by decoupling the pattern mining logic in NGLA from that of the event search algorithm in SES. In block 328 of this embodiment, the translated output of NGLA can be employed by SES to generate vector representations for the known events whereby a vector representation of an event can denote that event's signature. In accordance with an embodiment of the present invention, in block 329, the generated signatures can be stored in a database. These stored signatures can be managed and used for subsequent event search tasks.

According to an embodiment, the above-described process can be repeated for unknown events as well. In block 312b, multiple sets of logs can be obtained for unknown events where each set of logs represent detailed system-level information for an unknown event. In this embodiment, logs can likewise be heterogeneous and can include both text-based logs and time-series-based logs. In block 314b a testing request can be submitted by the user of the system, and the system can then call components of the NGLA system to mine and discover a variety of relevant log patterns. The variety of log patterns can include different categories of log patterns including, but not limited to sequential patterns, periodic patterns, and correlation patterns. Analogous to the previously described embodiments, the log patterns discovered for the unknown events can be the same as those discovered for the known events or different therefrom. In block 336, an NGLA2SES adapter can translate the output log patterns from NGLA obtained in block 334 into an acceptable input for SES by decoupling the pattern mining logic in NGLA from that of the event search algorithm in SES.

Referring now to FIG. 3B with continued reference to FIG. 3A, in block 338, a signature matching component of SES can be called to evaluate the similarity between known events and a given unknown event in a manner analogous to the evaluation of block 320a. In block 320b, the results of block 338 including matched known and unknown events can be saved in accordance with a file format (e.g., a JAVASCRIPT™ Object Notation (JSON)) schema and managed to enable the results to be visualized by or displayed to a user/administrator of the system. In block 330b, based on the results saved and managed in block 320b, a variety of options of steps or actions are presented that a user/administrator can take to troubleshoot the system or to expedite fault diagnosis and improve fault tracking.

Figure 4A:
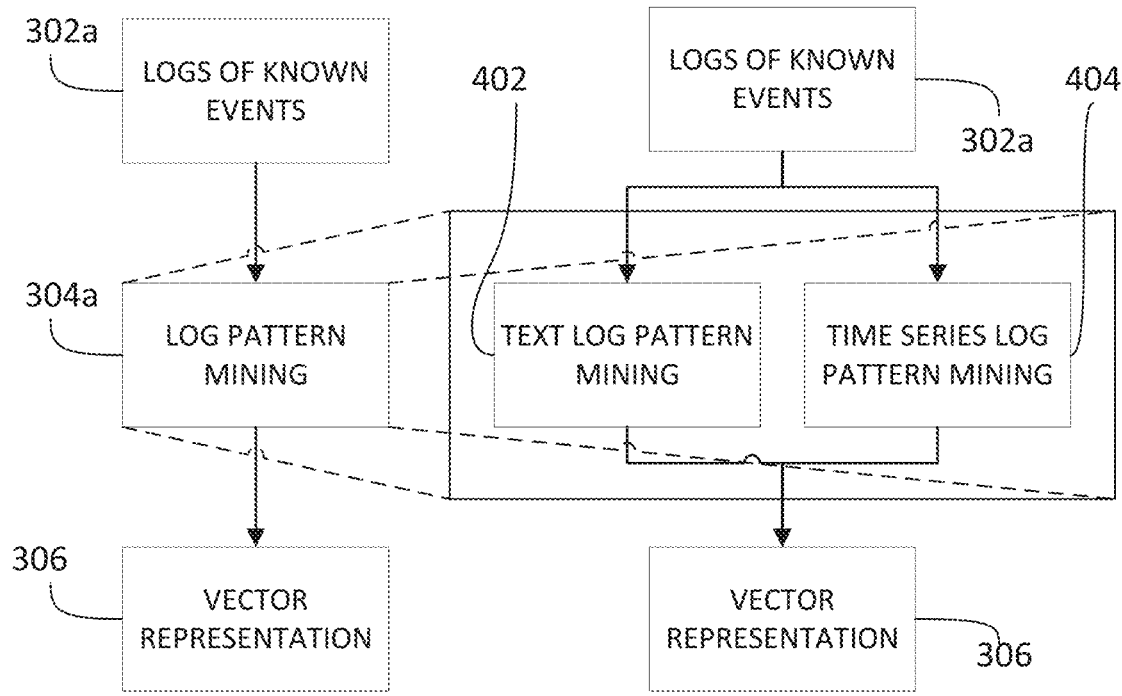
FIG. 4A is a block/flow diagram illustrating log pattern mining for known events in accordance with an embodiment the present invention.

Referring now to FIG. 4A, a detailed depiction of a log pattern mining 304a for known events in accordance with an embodiment of the present invention is provided. Having obtained logs of known events in block 302a, both text and time-series based log patterns can be mined in blocks 402 and 404 respectively. The text based log patterns can be mined in block 402 using analytical techniques to discover a variety of text based patterns including schema patterns, sequential patterns, periodic patterns, and the like. Time-series based log patterns can be mined in block 404 likewise using analytical techniques to discover time-series based patterns such as correlation patterns, burst patterns, and the like. Thus, a set of log patterns of log patterns with a variety of pattern identifiers (IDs) appearing in the known events as well as the occurrence frequency of the patterns in the known events can be obtained as a result of blocks 402 and 404 and can be then provided as an input for block 306.

Figure 4B:
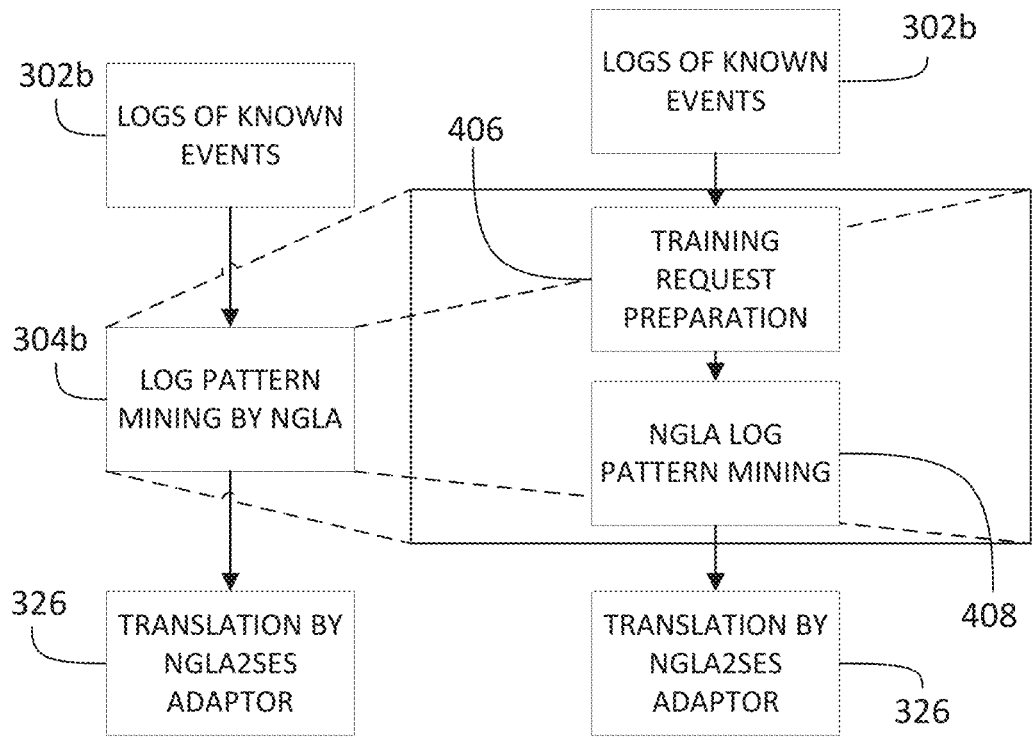
FIG. 4B is a block/flow diagram illustrating log pattern mining via Next Generation Log Analytics (NGLA) for known events in accordance with an embodiment the present invention.

Referring now to FIG. 4B, a detailed depiction of log pattern mining for known events via NGLA 304b in accordance with an alternative embodiment of the present invention is shown. In this embodiment, users can control the functionality of the system by using requests described in files. In block 406, to generate event signatures, users can submit training requests in JSON format including instructions regarding how input logs for known events can be accessed, details of a signature database, the types/categories of log patterns to extract, and the type of request. By reading the training requests of block 406, the relevant components of NGLA are called in block 408 to perform log pattern mining on the input logs.

Figure 5A:
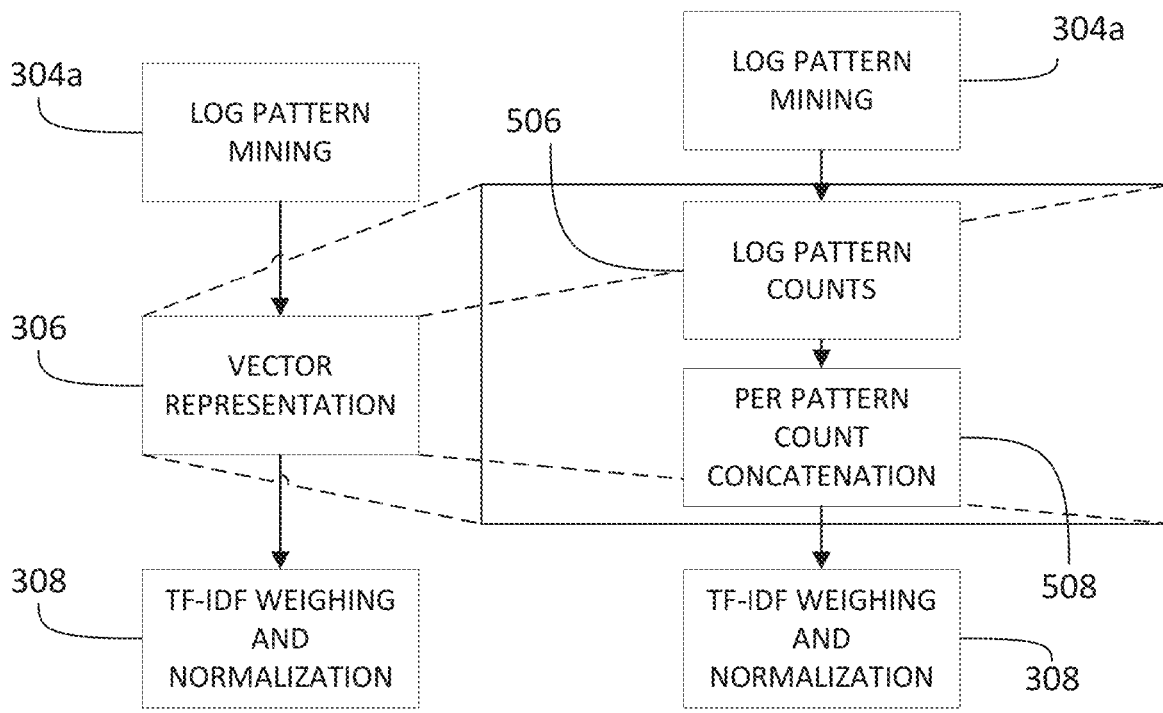
FIG. 5A is a block/flow diagram illustrating vector representation for known events in accordance with an embodiment the present invention

Referring now to FIG. 5A, a detailed depiction of vector representation of known events 306 in accordance with an embodiment of the present invention is provided. In block 506, the number of occurrences of each specific pattern discovered/obtained in block 304a for each individual known event. In block 508, the per-pattern counts are concatenated into a multi-dimensional vector, wherein each dimension denotes a specific pattern discovered/obtained in block 304a and the value of the vector in a given dimension is the count calculated in block 506. Thus, because each dimension of the vector representation denotes a specific log pattern, the number of dimensions a vector representation has is the number of log patterns within the set of log patterns represented by the vector.

Figure 5B:
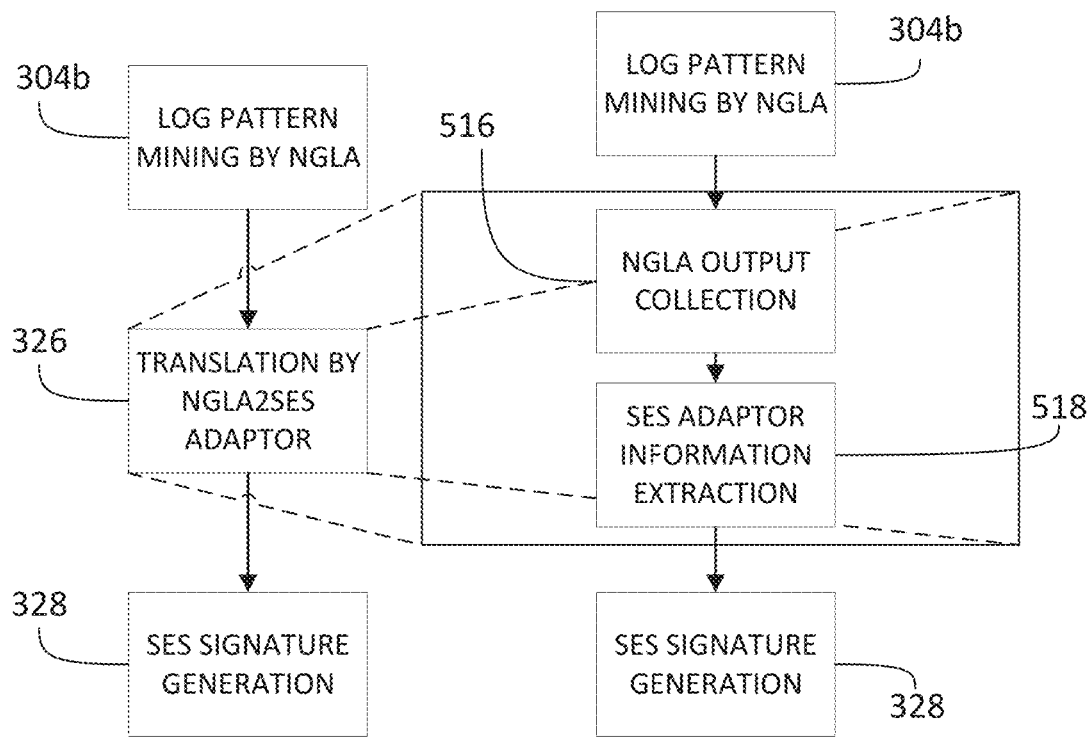
FIG. 5B is a block/flow diagram illustrating NGLA output to a System Event Search (SES) tool input translation for known events in accordance with an embodiment the present invention.
Figure 5C:
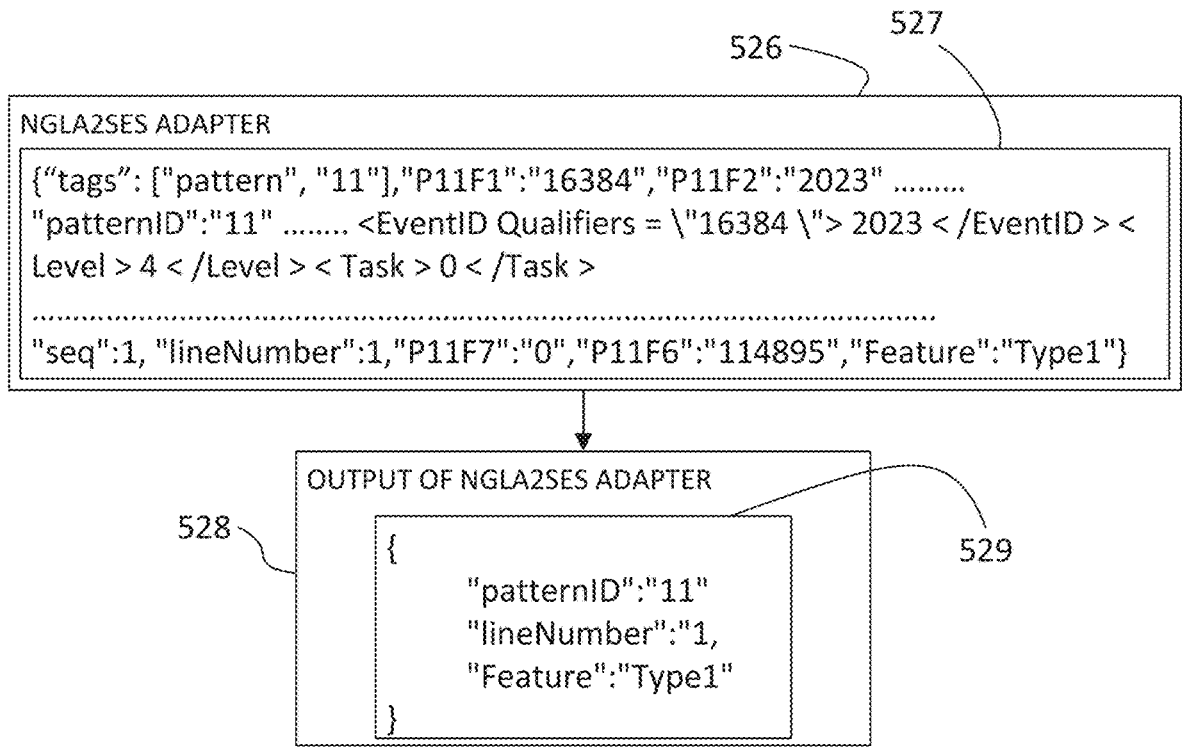
FIG. 5C is a block/flow diagram illustrating an example NGLA output having been translated into an example SES input for known events in accordance with an embodiment the present invention.

Referring now to FIGS. 5B-5C, a detailed depiction of NGLA output to SES input translation 326 for known events is provided in accordance with an embodiment of the present invention. In particular, FIG. 5C shows a translation by an NGLA2SES adapter 526 of an exemplary JSON object 527 that was output by NGLA, into a different exemplary JSON object 529 output by the NGLA2SES adapter 526 in block 528, suitable as an input for SES. In block 516, an NGLA2SES adapter 526 can collect the relevant output from NGLA for the log pattern types that are enabled in the training request of block 406. The output of NGLA can include multiple JSON objects, where each JSON object indicates the occurrence of a specific log pattern. For example, as can be seen in FIG. 5C, a JSON object 527 generated by NGLA can include an indication of an occurrence of a "Type 1" log pattern (which can have been previously defined or selected in block 406). In block 518, information that can be used for event searching via SES including, but not limited to, log pattern type, pattern id, and pattern-type-specific information is extracted by the NGLA2SES adapter from JSON object 527 and included in JSON object 529. The employment of the NGLA2SES adapter 526 can enable easy system maintenance because the NGLA2SES adapter 526 can decouple the logic used by NGLA from the logic used by SES. Because both NGLA and SES are fast evolving systems, and their internal logic could be changed or enhanced for better performance, the use of the NGLA2SES adapter 526 can avoid having to modify either of NGLA and SES by allowing the modification of the NGLA2SES adapter 526 to be sufficient for the continued interoperability of NGLA with SES despite the continued evolution of both NGLA and SES.

Figure 6:
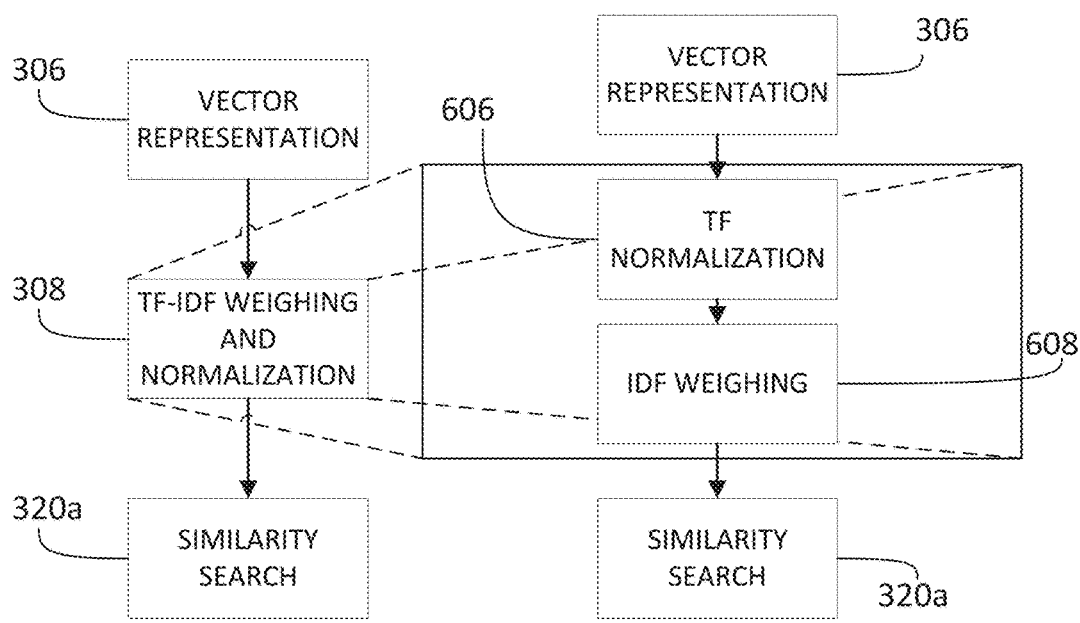
FIG. 6 is a block/flow diagram illustrating term frequency-inverse document frequency (TF-IDF) weighting and normalization for known events in accordance with an embodiment the present invention.

Referring now to FIG. 6, a detailed depiction of TF-IDF weighing and normalization 308 for known events in accordance with an embodiment of the present invention is provided. In block 606, the per-pattern counts for patterns obtained from block 304a that belong to the same category/type (e.g. schema pattern) can be normalized by the total number of counts for that pattern category. For example, if four schema patterns P1, P2, P3, and P4 are obtained and there is a system event whose schema pattern counts for P1, P2, P3, and P4 are 1, 2, 3, and 4, respectively, then, the vector representation of this event can be (1, 2, 3, 4). Consequently, after this term-frequency (TF) normalization in block 606, the vector representation can be transformed into (0.1, 0.2, 0.3, 0.4). In block 608, inverse-document-frequency (IDF) weights can be calculated based on the vector representation of all the known events. According to an embodiment of the present invention: letting N denote the number of known events, $x_i$ denote the vector representation of a system event, and $x_i(j)$ denote the value of $x_i$ in its j-th dimension, the IDF weight of the j-th dimension idf(j) can be calculated by $$idf(j) = \frac{N}{|\{i \mid x_i(j) > 0\}|}.$$

Having obtained the IDF weights, the vector representation of each event can be further updated to: weighted $x_i(j)=x_i(j) \times idf(j)$. Consequently, this TF-IDF weighted vector representation of each known event can be stored and can be used for system event search queries/tasks for an arbitrary number of unknown system events.

Figure 7:
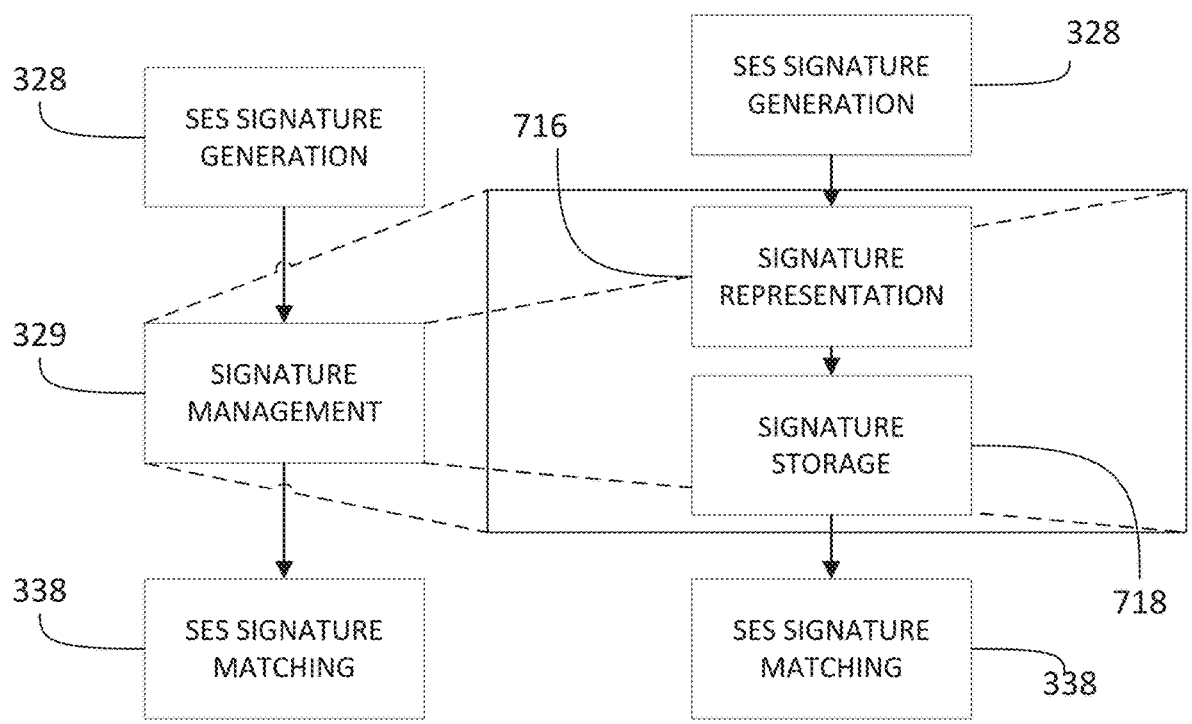
FIG. 7 is a block/flow diagram illustrating signature database management for known events in accordance with an embodiment the present invention.

Referring now to FIG. 7, a detailed depiction of signature management 329 according to an embodiment of the present invention is provided. In block 716 a multi-dimensional vector, analogous to the vector representation of block 508 can denote the signature of each event obtained from the information in block 518. In this embodiment, the vector representation of each event can also be formatted as a JSON object where keys in the object can include pattern identifiers (IDs) and the values in the object can include signature values. In block 402, event signatures encoded as JSON objects can be stored in a data store or database (e.g., an Elasticsearch-based database). Event signatures can also be indexed in the database to enable high efficiency for a subsequent event search for unknown events. Thus, a signature base can be built based on input logs for known events from block 302a and managed to provide high efficiency and fault tolerance.

Figure 8A:
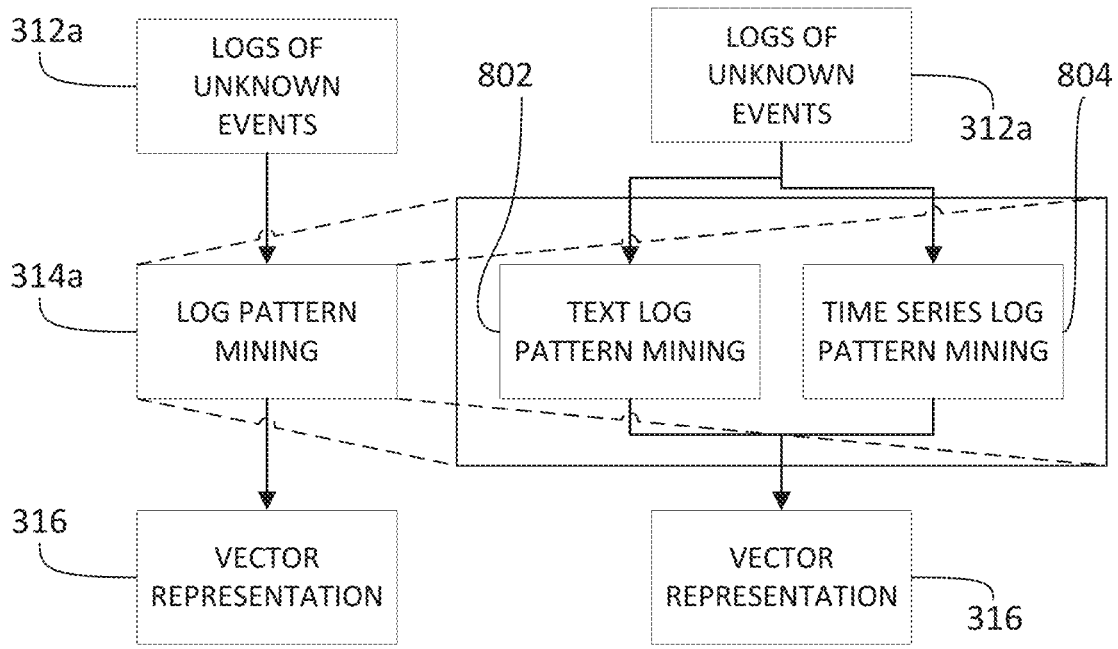
FIG. 8A is a block/flow diagram illustrating log pattern mining for unknown events in accordance with an embodiment the present invention.

Referring now to FIG. 8A, a detailed depiction of log pattern mining 314a for unknown events in accordance with an embodiment of the present invention is provided. Having obtained logs of known events in block 312a, both text and time-series based log patterns can be mined in blocks 802 and 804 respectively. The text based log patterns can be mined in block 802 using analytical techniques to discover a variety of text based patterns including schema patterns, sequential patterns, periodic patterns, and the like. Time-series based log patterns can be mined in block 804 likewise using analytical techniques to discover time-series based patterns such as correlation patterns, burst patterns, and the like. It should be understood that, in this embodiment, the pattern identifiers (IDs) for the unknown events from blocks 802 and 804 can be the aligned with, analogous to, or the same as the embodiment the pattern identifiers (IDs) for the known events from blocks 402 and 404.

Figure 8B:
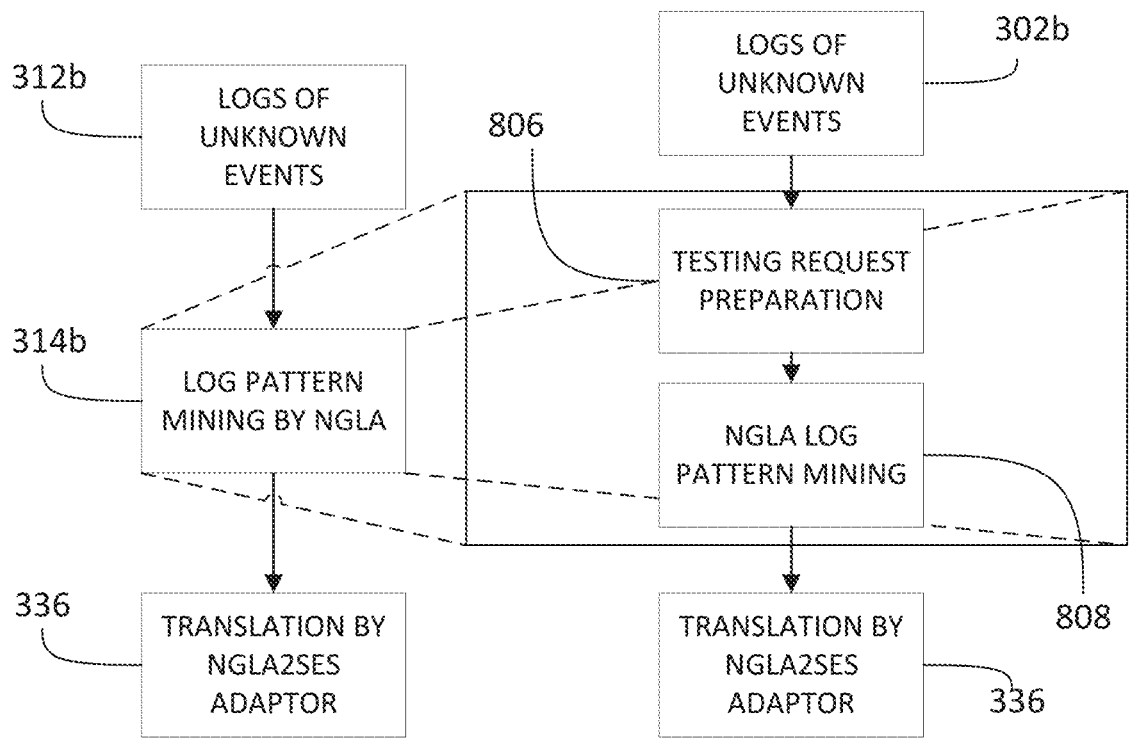
FIG. 8B is a block/flow diagram illustrating log pattern mining via NGLA for unknown events in accordance with an embodiment the present invention.

Referring now to FIG. 8B, a detailed depiction of log pattern mining for unknown events via NGLA 314b in accordance with an alternative embodiment of the present invention is depicted. In this embodiment, users can control the functionality of the system by using requests described in files. In block 806, to generate event signatures, users can submit testing requests in JSON format including instructions regarding how input logs for unknown events can be accessed, details of a signature database, the types/categories of log patterns to extract, and the type of request. By reading the testing requests of block 806, the relevant components of NGLA are called in block 808 to perform log pattern mining on the input logs.

Figure 9A:
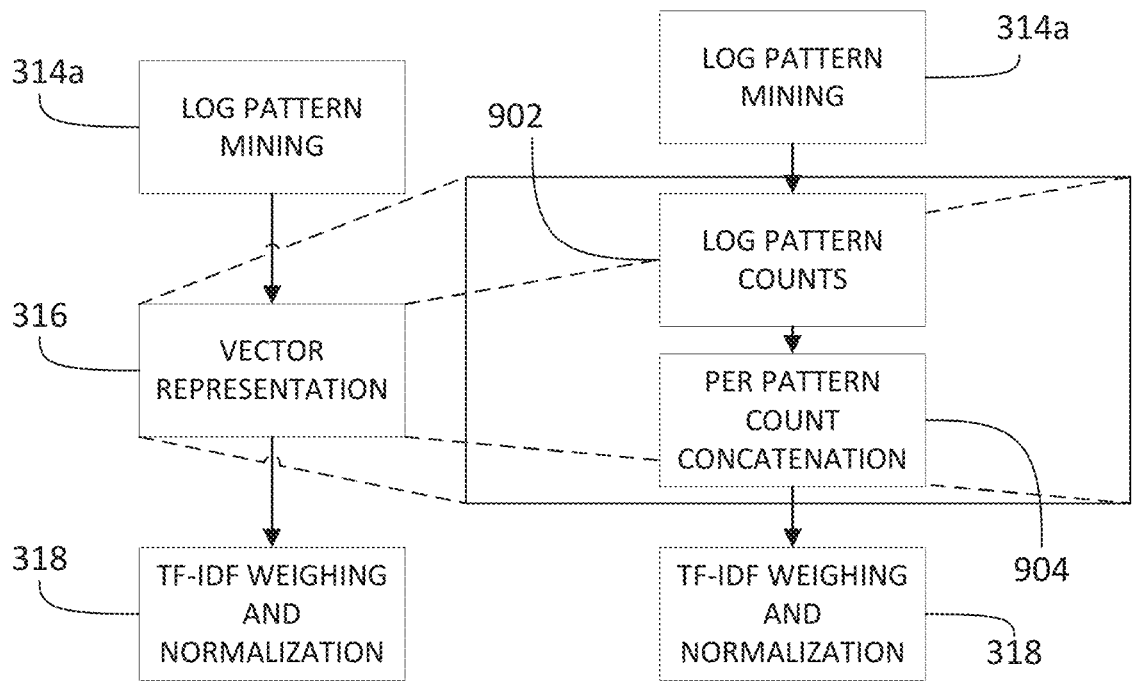
FIG. 9A is a block/flow diagram illustrating vector representation for known events in accordance with an embodiment the present invention.

Referring now to FIG. 9A, a detailed depiction of vector representation of unknown events 316 in accordance with an embodiment of the present invention is provided. In block 902, the number of occurrences of each specific pattern discovered/obtained in block 314a for each individual unknown event. In block 904, the per-pattern counts are concatenated into a multi-dimensional vector, wherein each dimension denotes a specific pattern discovered/obtained in block 314a and the value of the vector in a given dimension is the count calculated in block 902. Thus, because each dimension of the vector representation denotes a specific log pattern, the number of dimensions a vector representation has is the number of log patterns within the set of log patterns represented by the vector. It should be understood that, in this embodiment, the vector representations in block 904 can be aligned with the vector representations in block 508.

Figure 9B:
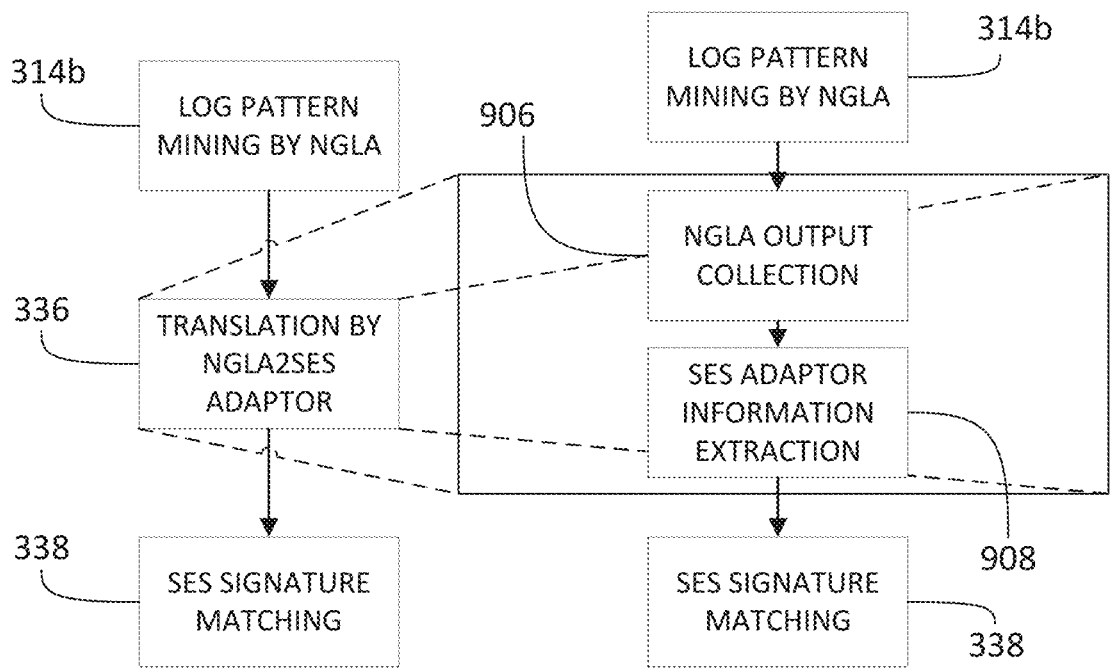
FIG. 9B is a block/flow diagram illustrating NGLA output to SES tool input translation for unknown events in accordance with an embodiment the present invention.

Referring now to FIG. 9B, a detailed depiction of NGLA output to SES input translation 336 for unknown events is provided in accordance with an embodiment of the present invention. In block 906 an NGLA2SES adapter can collect the relevant output from NGLA for the log pattern types that are enabled in the testing request of block 806. The output of NGLA can include multiple JSON objects, where each JSON object indicates the occurrence of a specific log pattern. In block 908, information that can be used for unknown event searching via SES including, but not limited to, log pattern type, pattern id, and pattern-type-specific information is extracted by the NGLA2SES adapter. Consequently, in block 338, the signature matching component can be called in SES to use the extracted information to evaluate the similarity between known events and a given unknown event.

Figure 10:
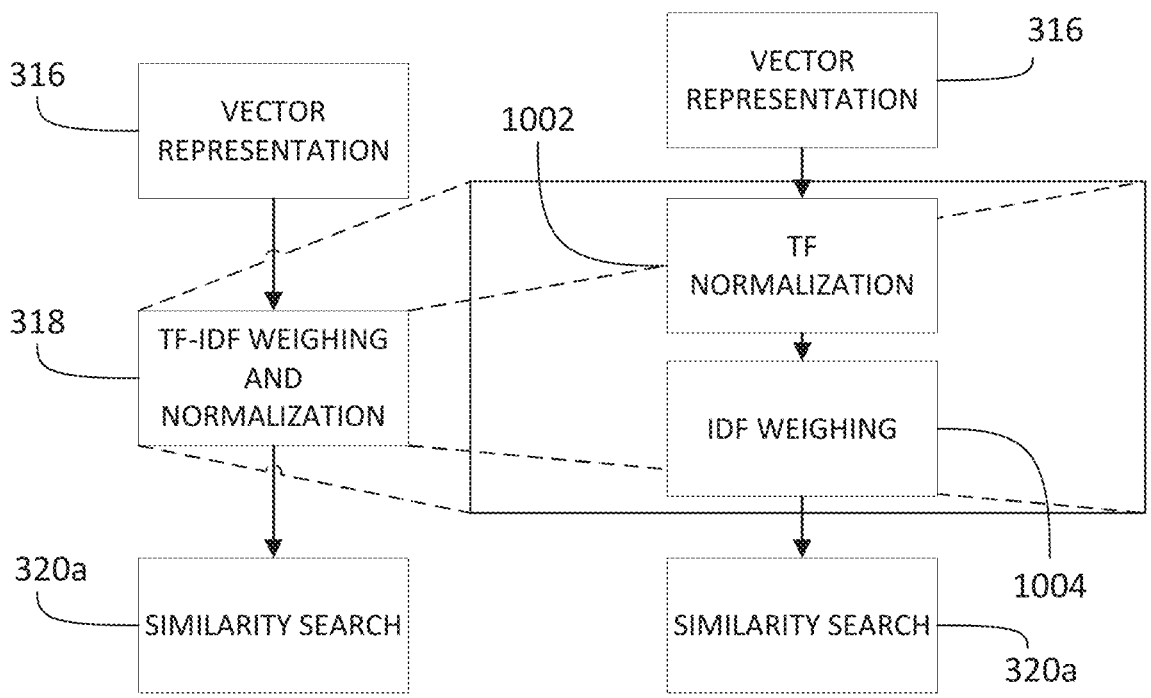
FIG. 10 is a block/flow diagram illustrating TF-IDF weighting and normalization for unknown events in accordance with an embodiment the present invention.

Referring now to FIG. 10, a detailed depiction of TF-IDF weighing and normalization 318 for unknown events in accordance with an embodiment of the present invention is provided. In block 1002, the per-pattern counts for patterns obtained from block 314a that belong to the same category/type (e.g. schema pattern) can be normalized by the total number of counts for that pattern category. In block 1004, inverse-document-frequency (IDF) weights can be calculated based on the vector representation of all the known events and the calculated IDF weights can be used to further weigh the vector representations. It should be understood that, in this embodiment, the TF-IDF weighted vector representations of unknown events are comparable with the TF-IDF weighted vector representations for the known events from block 308.

Figure 11:
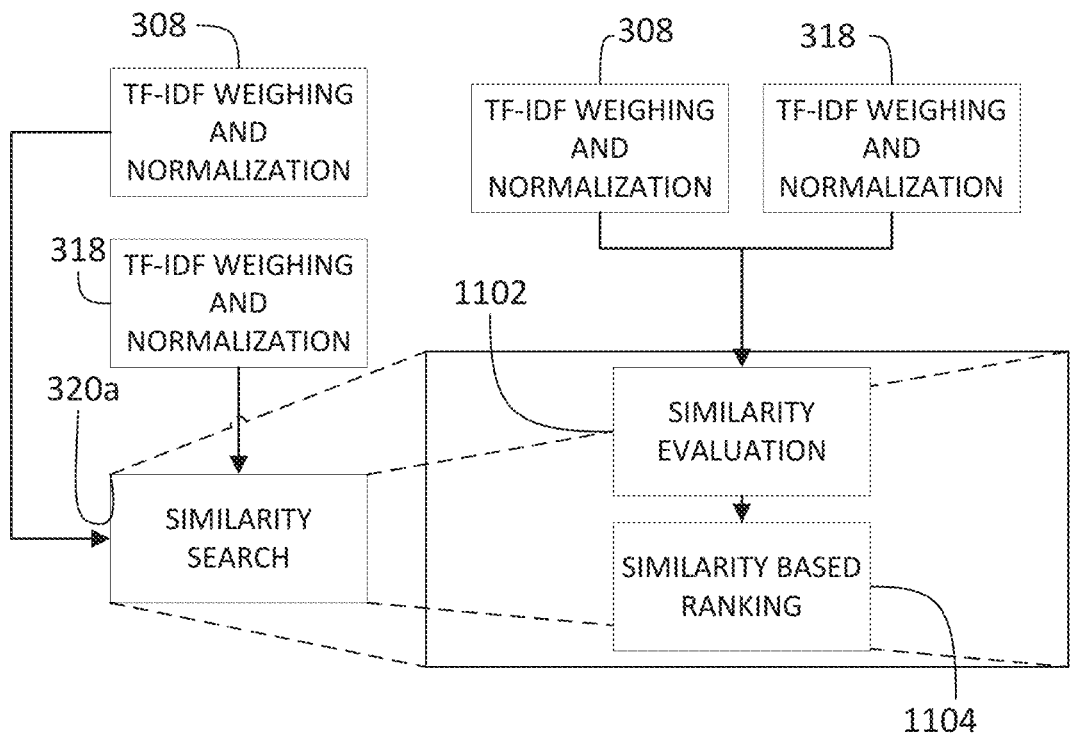
FIG. 11 is a block/flow diagram illustrating a similarity search in accordance with an embodiment the present invention.
Figure 12:
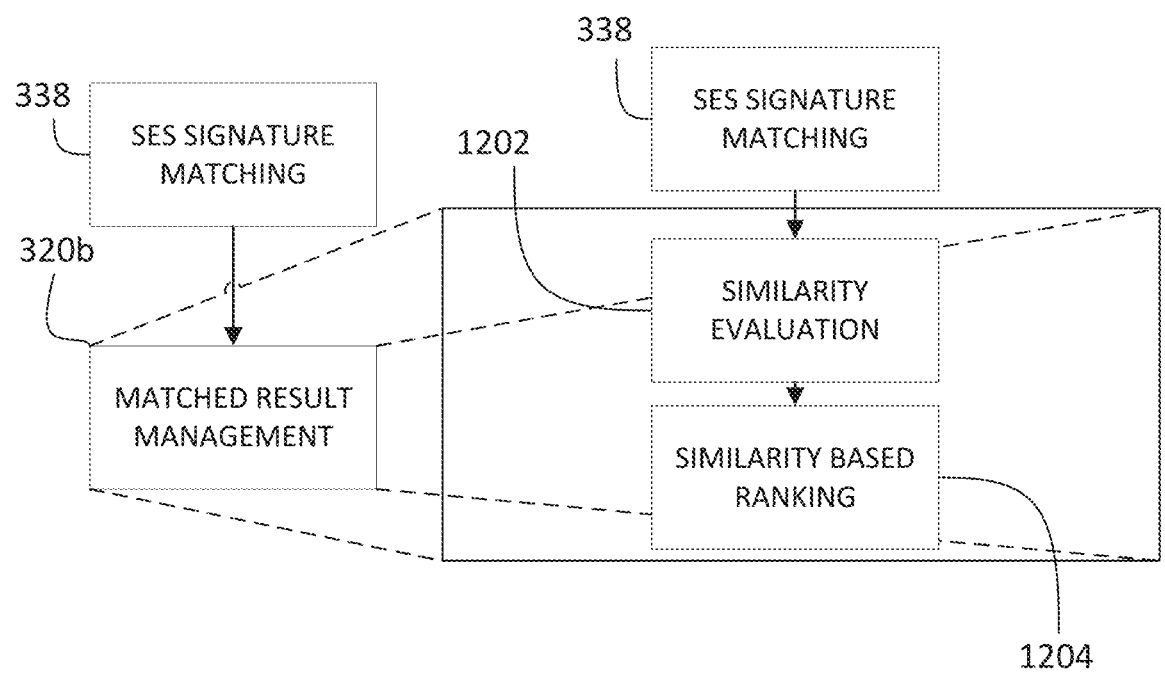
FIG. 12 is a block/flow diagram illustrating matched result management in accordance with an embodiment the present invention

Referring now to FIG. 11, a detailed depiction of a similarity search 320a in accordance with an embodiment of the present invention is provided. In block 1102 a similarity between known and unknown events can be evaluated. In one exemplary embodiment, the similarity can be evaluated via a cosine similarity calculation as follows: letting $x_i$ be a vector representation of a known event i and $y_k$ be a vector representation of an unknown event k, the similarity of known event i and unknown event k can be calculated by:

$$\text{similarity}(x_i, y_k) = \frac{x_i \cdot y_k}{|x_i||y_k|}.$$

In block 1104, after evaluating the similarity of unknown event k against all the known events, all of the similarity scores are then ranked in order from highest to lowest. Accordingly, the known event with the highest similarity score can be understood to be the most similar known event to unknown event k.

Referring now to FIG. 11, a detailed depiction of match result management for unknown events 320b according to an embodiment of the present invention is provided. In block 1202 a matched result for each unknown event can be encoded as a JSON object that can have various fields including a "Relevance" field and a "dataLabel" field among others. In block 1204, all the matched results (e.g., JSON objects) can be stored in a data store, server, or database (e.g., Elasticsearch database) so that users can have the flexibility of ranking, filtering, and manipulating the results as well as visualizing and displaying the matched results (e.g., via a screen or display). Based on the matched results, according to an embodiment of the present invention, troubleshooting options can be provided (e.g., via a display) to a user/administrator of a system to facilitate identification of system operation issues, expedite fault diagnosis and improve fault tracking.

Embodiments described herein can be entirely hardware, entirely software or including both hardware and software elements. In a preferred embodiment, the present invention is implemented in software, which includes but is not limited to firmware, resident software, microcode, etc.

Embodiments can include a computer program product accessible from a computer-usable or computer-readable medium providing program code for use by or in connection with a computer or any instruction execution system. A computer-usable or computer readable medium can include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium can include a computer-readable storage medium such as a semiconductor or solid state memory, magnetic tape, a removable computer diskette, a random access memory (RAM), a read-only memory (ROM), a rigid magnetic disk and an optical disk, etc.

Each computer program can be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The embodiments of the present inventive system can also be considered to be embodied in a computer-readable storage medium, configured with a computer program, where the storage medium so configured causes a computing device (e.g., computer) to operate in a specific and predefined manner to perform the functions described herein.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) can be coupled to the system either directly or through intervening I/O controllers.

Network adapters can also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for system event searching based on heterogeneous logs, the method comprising:
    mining, by the processor device based on instructions stored on a storage device coupled to the processor device, a plurality of log patterns from a first plurality of heterogeneous logs and a second plurality of heterogeneous logs to obtain a set of known-event log patterns for each known event and a set of unknown-event log patterns for each unknown event;

building, by the processor device, an inverse-document-frequency (IDF) weighted vector representation of each set of known-event log patterns and of each set of unknown-event log patterns, wherein IDF weights are determined by:

$$idf(j) = \frac{N}{|\{i \mid x_i(j) > 0\}|},$$

with idf(j) denoting an IDF weight of a j-th dimension, N denoting a number of known events, $x_i$ denoting a vector representation of a system event, and $x_i(j)$ denoting a value of $x_i$ in the j-th dimension;

evaluating, by the processor device, a similarity score of the vector representation of each set of unknown-event log patterns to the vector representation of each set of known-event log patterns;

identifying, by the processor device, a known event that is most similar to an unknown event based on the evaluated similarity score to troubleshoot system faults based on past actions for similar events to improve an operation of a computer system; and display troubleshooting options to a user including fault tracking and system operation guidance.

2. The method as recited in claim 1, wherein mining each of the plurality of heterogeneous logs of known events and the plurality of heterogeneous logs of unknown events includes mining at least one of text-based logs and time-series-based logs.

3. The method as recited in claim 1, wherein the plurality of log patterns includes different categories of patterns.

4. The method as recited in claim 1, wherein building the weighted vector representation includes denoting a specific log pattern for each dimension of the vector representation and setting the vector representation's dimensionality being defined by a number of log patterns within the set of log patterns the vector representation represents.

5. The method as recited in claim 1, wherein building the weighted vector representation includes a value of the vector representation in each dimension being defined by the number of times a specific log pattern appears within the set of log patterns the vector representation represents.

6. The method as recited in claim 1, wherein mining is performed via Next Generation Log Analytics (NGLA).

7. The method as recited in claim 6, wherein building a vector representation includes translating an obtained set of log patterns into a different format that is feasible to be input into a System Event Search (SES) tool by decoupling NGLA pattern mining logic from the logic of the SES searching algorithm.

8. The method as recited in claim 6, wherein building a vector representation includes generating a vector representation from a translated set of log patterns whereby a vector representation denotes an event's signature.

9. The method as recited in claim 6, further including storing event signatures in a signature database.

10. The method as recited in claim 6, wherein evaluating the similarity includes matching signatures of unknown events to signatures of unknown events.

11. The method as recited in claim 6, further including saving matched events according to a file format schema and displaying troubleshooting options via a display device.

12. A computer system for searching system events based on heterogeneous logs, comprising:

a processor device operatively coupled to a memory device, the processor device being configured to:

mine a plurality of log patterns from a first plurality of heterogeneous logs and a second plurality of heterogeneous logs to obtain a set of known-event log patterns for each known event and a set of unknown-event log patterns for each unknown event;

build an inverse-document-frequency (IDF) weighted vector representation of each set of known-event log patterns and of each set of unknown-event log patterns, wherein IDF weights are determined by:

$$idf(j) = \frac{N}{|\{i \mid x_i(j) > 0\}|},$$

with idf(j) denoting an IDF weight of a j-th dimension, N denoting a number of known events, $x_i$ denoting a vector representation of a system event, and $x_i(j)$ denoting a value of $x_i$ in the j-th dimension;

evaluate a similarity score of the vector representation of each set of unknown-event log patterns to the vector representation of each set of known-event log patterns;

identify a known event that is most similar to an unknown event based on the evaluated similarity score to troubleshoot system faults based on past actions for similar events to improve an operation of a computer system; and display troubleshooting options to a user including fault tracking and system operation guidance.

13. The system as recited in claim 12, wherein each of the plurality of heterogeneous logs of known events and the plurality of heterogeneous logs of unknown events include at least one of text-based logs and time-series-based logs.

14. The system as recited in claim 12, wherein the plurality of log patterns includes different categories of patterns.

15. The system as recited in claim 12, wherein each dimension of the vector representation denotes a specific log pattern and wherein the vector representation's dimensionality is defined by a number of log patterns within the set of log patterns the vector representation represents.

16. The system as recited in claim 12, wherein a value of the vector representation in each dimension is defined by the number of times a specific log pattern appears within the set of log patterns the vector representation represents.

17. A computer program product for searching system events based on heterogeneous logs, the computer program product comprising a non-transitory computer readable storage medium having program instructions embodied therewith, the program instructions executable by a computing device to cause the computing device to perform the method comprising:

mining, by the processor device based on instructions stored on a storage device coupled to the processor device, a plurality of log patterns from a first plurality of heterogeneous logs and a second plurality of heterogeneous logs to obtain a set of known-event log patterns for each known event and a set of unknown-event log patterns for each unknown event;

building, by the processor device, an inverse-document-frequency (IDF) weighted vector representation of each set of known-event log patterns and of each set of unknown-event log patterns, wherein IDF weights are determined by:

$$idf(j) = \frac{N}{|\{i \mid x_i(j) > 0\}|},$$

with idf(j) denoting an IDF weight of a j-th dimension, N denoting a number of known events, $x_i$ denoting a vector representation of a system event, and $x_i(j)$ denoting a value of $x_i$ in the j-th dimension;

evaluating, by the processor device, a similarity score of the vector representation of each set of unknown-event log patterns to the vector representation of each set of known-event log patterns;

identifying, by the processor device, a known event that is most similar to an unknown event based on the evaluated similarity score to troubleshoot system faults based on past actions for similar events to improve an operation of a computer system; and display troubleshooting options to a user including fault tracking and system operation guidance.

18. The product as recited in claim 17, wherein mining is performed via Next Generation Log Analytics (NGLA).

19. The product as recited in claim 17, wherein building a vector representation includes translating an obtained set of log patterns into a different format that is feasible to be input into a System Event Search (SES) tool by decoupling NGLA pattern mining logic from the logic of the SES searching algorithm.

20. The product as recited in claim 17, wherein building a vector representation includes generating a vector representation from a translated set of log patterns whereby a vector representation denotes an event's signature.

* * * * *